Jan. 1, 1957  J. E. LEISER  2,775,843
FISHING BOBBER
Filed June 24, 1954
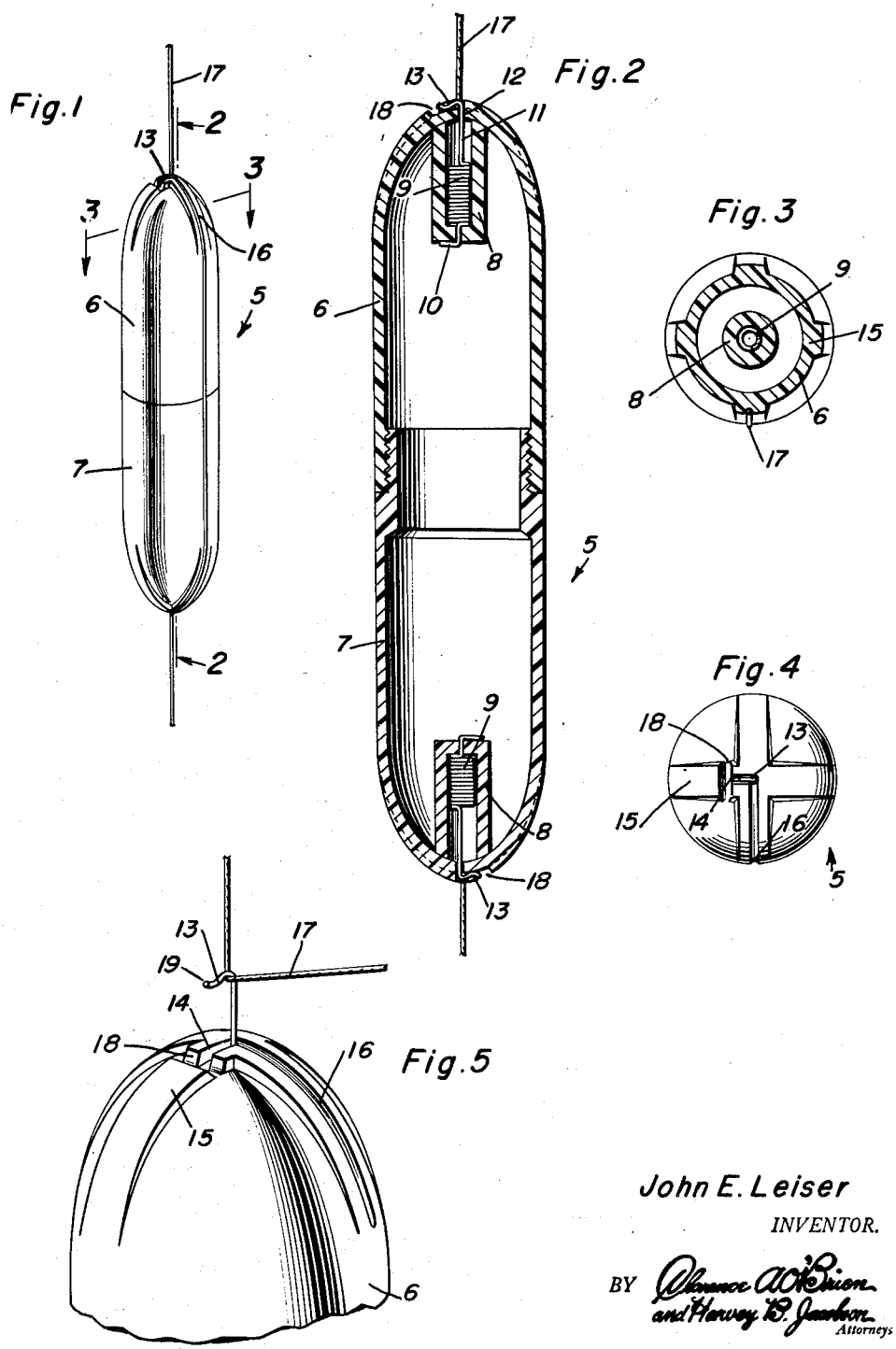
John E. Leiser
INVENTOR.

2,775,843
FISHING BOBBER

John E. Leiser, Twin Falls, Idaho

Application June 24, 1954, Serial No. 438,995

2 Claims. (Cl. 43—44.95)

The present invention relates to new and useful improvements in fishing bobbers or floats, and has for its primary object to construct the bobber of a shape whereby resistance or drag is reduced to a minimum when reeling in the fishing line.

Another object of the invention is to provide a hollow float constructed of separable sections to facilitate placing a suitable quantity of water therein to maintain the float in a partially submerged upright condition and to increase the weight thereof for casting when no sinker is used.

A still further object of the invention is to provide quick adjustable line attaching means for each end of the bobber or float.

A still further object is to provide a device of this character of simple and practical construction, which is efficient and reliable in operation, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view;

Figure 2 is an enlarged vertical sectional view taken on the line 2—2 of Figure 1;

Figure 3 is a transverse sectional view, taken on the line 3—3 of Figure 1;

Figure 4 is an end elevational view; and

Figure 5 is a fragmentary enlarged perspective view showing the line attaching means at one end of the bobber.

Referring now to the drawing in detail, wherein for the purpose of illustration, I have disclosed a preferred embodiment of my invention, the numeral 5 designates the bobber or float generally, and which is constructed of hollow, elliptical shape and composed of a pair of separable sections 6 and 7 threadedly connected to each other at the central portion of the bobber.

The outer end portion of each section 6 and 7 is identical in construction, and accordingly, a detailed description of one will suffice for both. Each section may be constructed of plastic, aluminum or other suitable non-corrosive material, and is formed with an internal chamber or housing 8 at the outer end portion of each section. A coil spring 9 is positioned in the housing or chamber 8 with one end portion 10 of the spring suitably anchored to the innermost portion of the housing, and with the other end portion 11 of the spring slidable in an opening 12 in the adjacent end of the hollow body 5 to project outwardly of the body and formed with a hook 13. The hook is adapted to enter a groove 14 in the outer surface of the body 5 in a protected position therein.

Each outer end portion of the body 5 is also formed with a plurality of longitudinally extending ribs 15 which merge in a longitudinal inward direction with the surface of the body, and the ribs are preferably arranged at an angle of 90° with respect to each other. One of the ribs 15 is formed with a longitudinally extending groove 16 which communicates at the end of the body with the groove 14 and at right angles with respect to the latter.

A fishing line 17 is engaged by the hooks 13 at each end of the hollow body 5 to extend the line longitudinally of the body in the grooves 16, and the hooks are retracted by the coil springs 9 to enter the grooves 14 to secure the bobber in a desired adjusted position on the line.

Groove 14 intersects a groove 18 which extends transversely of an adjacent rib 15 and hook 13 is formed with an outwardly curved lip 19 exposed in groove 18 for engaging a loop (not shown) in the line under the hook to pull the hook outwardly to facilitate placing the line in position for clamping in groove 16 by the hook.

The bobber may be filled with a suitable quantity of water to add desired weight thereto for casting.

What is claimed as new is as follows:

1. A fishing bobber comprising an elongated hollow buoyant body, a chamber internally of the body and extending inwardly at each end of the body, said body having a pair of external right angularly disposed communicating grooves at each end, and a spring retracted hook at each end of the body and including an inner end portion enclosed in and anchored to an adjacent chamber and an outer end portion adapted to enter one of said grooves for clamping a fishing line in the other of said grooves.

2. A fishing bobber comprising an elliptical hollow buoyant body, said body having a longitudinal groove at each end adapted to receive a fishing line, said body having a second groove intersecting the first groove at right angles thereto, a spring retracted hook recessed in the groove to clamp the line in the first groove, and a third groove intersecting the second groove and in which the bill of the hook is exposed to facilitate pulling the hook outwardly for engaging the line under the hook.

References Cited in the file of this patent

UNITED STATES PATENTS

| | | |
|---|---|---|
| 575,674 | Woodward | Jan. 19, 1897 |
| 2,209,638 | Smith | July 30, 1940 |
| 2,593,728 | Carpenter | Apr. 22, 1952 |
| 2,670,560 | Matras | Mar. 2, 1954 |
| 2,706,869 | Shoenfelt | Apr. 26, 1955 |